United States Patent
Thobroe

[15] 3,688,363
[45] Sept. 5, 1972

[54] INDEXING MACHINE
[72] Inventor: Eivind Christian Thobroe, The Vikings, Rodborough Common, Stroud, England
[22] Filed: Nov. 7, 1969
[21] Appl. No.: 874,796

[30] Foreign Application Priority Data

Nov. 14, 1968 Great Britain..........54,131/68

[52] U.S. Cl. ........................................29/38 A, 82/3
[51] Int. Cl. ..............................................B23b 9/06
[58] Field of Search ......29/38 A, 38 B; 74/816; 82/3, 82/2 D, 28 B

[56] References Cited

UNITED STATES PATENTS

| R25,886 | 10/1965 | Cargill......................29/33 P X |
| 3,283,625 | 11/1966 | Smith..............................82/3 |
| 2,876,527 | 3/1959 | Matlachowsky............29/38 B |
| 2,389,019 | 11/1945 | Bazley et al. ...................29/42 |
| 3,385,145 | 5/1968 | Jacoby..............................82/3 |
| 2,957,566 | 10/1960 | Brown ....................82/28.2 X |

*Primary Examiner*—Andrew R. Juhasz
*Assistant Examiner*—Z. R. Bilinsky
*Attorney*—Larson, Taylor and Hinds

[57] ABSTRACT

A multi-station machine tool has floating workholders in a common carrier which executes general locating movements to bring the workholders in succession to the stations. Precise indexing of the workholders with tools which are at those stations is provided by locating members which are driven into engagement with the workholders while the carrier is stationary, and these may either rotate the workholders or hold them stationary in a known rotational position while the tools operate on workpieces in the holders. The locating members are, in a preferred form, conical-ended plungers powered by a double-acting ram, and included power units for driving the tools towards and away from the work in the form of rams which are interchangeable with those used for driving the plungers.

10 Claims, 2 Drawing Figures

INDEXING MACHINE

BACKGROUND OF THE INVENTION

This invention relates to indexing machines. In these machines workpieces are held in a plurality of workholding fixtures (referred to as collets) to be operated on successively by various power tools. For this purpose the collets are arranged on a carrier, which is usually a turntable so that each can in turn be index to a work station where a particular tool is found. Once there, the tools move towards the workpiece to execute work on it.

In order that the tool shall work in a precisely determined position on the workpiece held in the collet the two must be brought exactly into a desired register. The precise control of movement of the whole of the carrier at all times is difficult to achieve. Moreover, it is desired quite often that the collet shall either rotate or else shall be stationary and adopt a predetermined angular relation to the carrier while the carrier is stationary and while the tool is approaching or working. To couple the necessary driving or positioning devices to the carrier is to increase the weight of the carrier and the difficulty of positioning it exactly.

There has previously been proposed in U.S. Pat. No. 3,283,625 relative motion between collets floating in a turntable carrier and locating members which engage the collets, center them and can drive them in rotation. In this construction the locating members do not move axially, but can move only rotationally, and the collets are lowered onto them and raised from them to engage with and disengage from them. This action involves movement of the whole of the collet carrier and thus the collet carrier has to execute two types of movement, one the rotational indexing movement of the turntable, the second the lowering onto the locating members and the raising from those members. The collet carrier has considerable inertia and this inertia has to be overcome not only in stopping and starting the rotating indexing motion but also in starting and stopping both the lowering and raising motions. Thus either there is a loss of time in adopting a position wherein the collets are ready to be worked on because the raising and lowering motions are slow, or else a source of large quantities of power has to be used for this motion or else, and this is the solution adopted in the aforesaid Patent, the distance of raising or lowering is cut down to a minimum. This means that because there can only be a small distance from top to bottom of the interengaging parts of the locating members and collets there can only be a comparatively small surface available for contact between the locating members and the collets and thus there could be a lack of accurate centering or of engagement between the collet and indexing member. One way to overcome this last problem is to adopt a solution shown in the aforesaid patent of making the engaging members of comparatively large diameter so that with only a small axial length of contact, there is still quite a large overall area of contact. However, this involves increased inertia in the locating member and in the collet, in respect of rotation about their own axes.

SUMMARY OF THE INVENTION

In contrast, in the present invention the carrier does not move, except in general indexing motions. It is not raised or lowered towards or away from the locating members. Rather, the locating members are driven into engagement with collets on the carrier. Thus the locating members may be, as shown in the later description, a part of comparatively small diameter providing a high area of driving contact and good centering effect by coming into contact with the collet over a considerable axial length. This implies also that it executes a considerable axial stroke—a matter of little difficulty since the inertia, both translational and rotational of the locating member can be low, and it can be of comparatively low mass. Further, since the collet carrier does not move downward onto the locating members it does not move away from the tools which are to work on the workpieces, and the distance of stroke of the tools before they come into operation on the workpiece can be kept to a minimum.

It is also to be noted that the power transmission arrangements and bearing arrangements needed for the present collet carriers whether they be turntables or linear carriers, can be simplified compared to what would be necessary in the prior aforesaid patent because the carrier executes motion in the indexing direction.

DESCRIPTION OF A PARTICULAR EMBODIMENT

A particular embodiment of the invention will now be described with reference to the accompanying drawings wherein.

Figure 1:
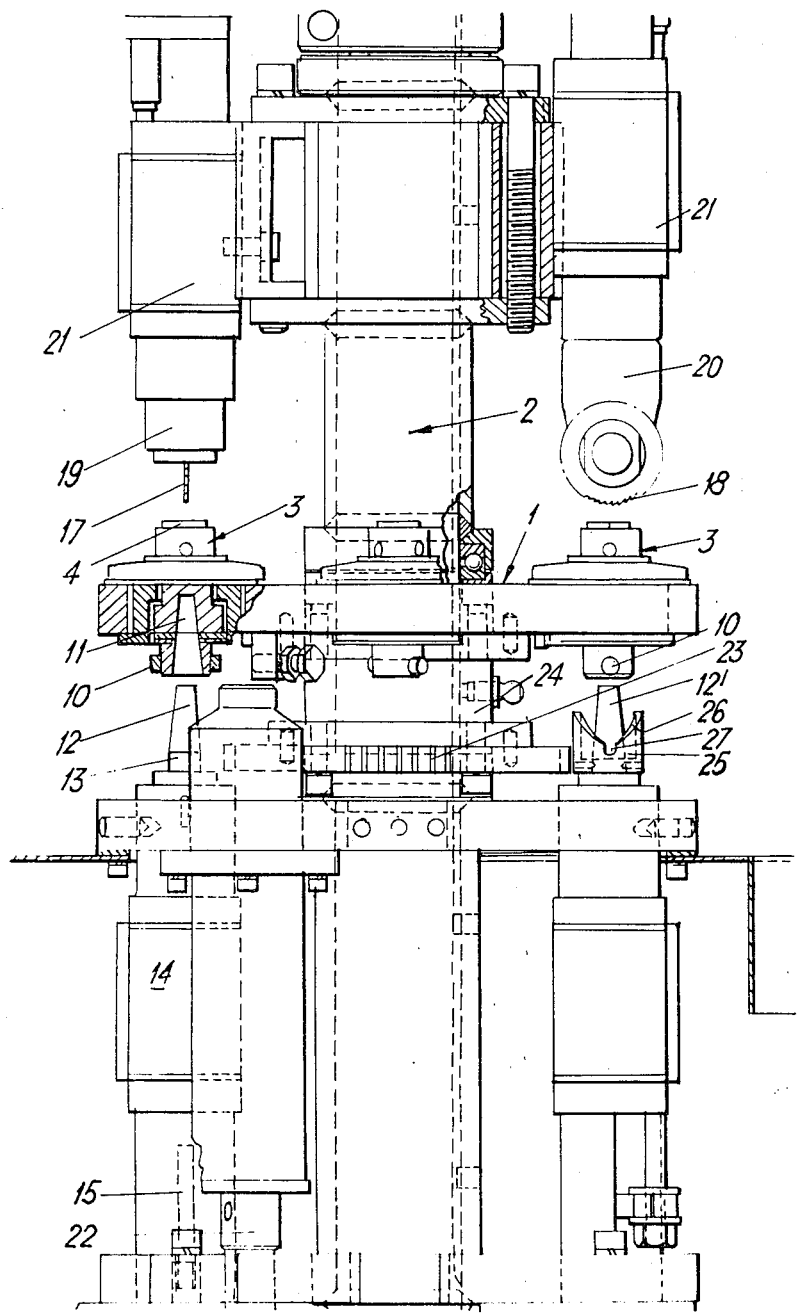
FIG. 1 is a side view, partly in section, of part of the embodiment.
Figure 2:
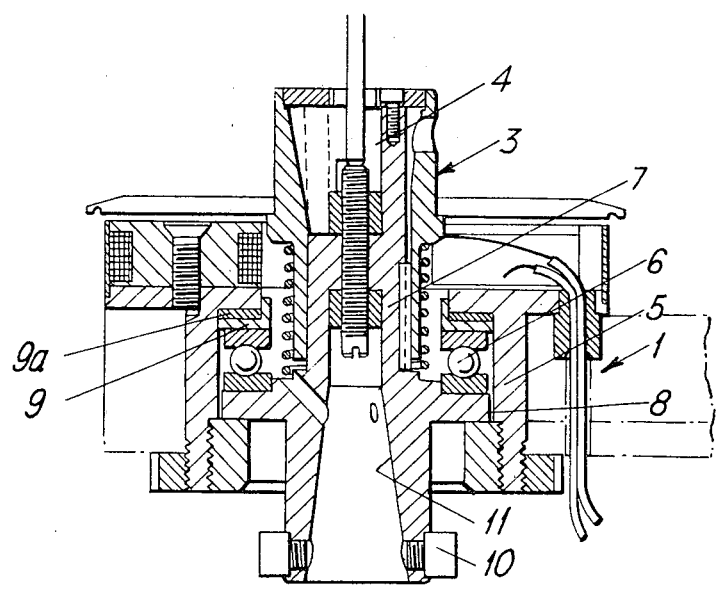
FIG. 2 is a diametrical section through a collet assembly.

In this embodiment a horizontal indexing machine has as its carrier a turntable 1 rotatable about the central column 2 of the machine at the center of which lies the central axis of the machine, which axis is vertical.

The turntable 1 carries a plurality of collet assemblies 3. In this case there are four; the machine may be embodied to have any number. The workholding parts 4 of the collet assemblies are rotatable in the turntable. Each collet assembly consists essentially of an outer shell 5 within which is mounted on anti-friction bearings 6 a tubular rotatable member 7 of generally cylindrical form. The rotatable member is terminated at one end by workholding parts and at the other end by means for engaging and mating with the locating member, which may also drive the member in rotation. The workholding parts are openable by magnetic action. The outer shell 5 of the collet assembly 3 is in the most general case permanently clamped to the turntable while the rotatable member 7 is free, to float within the outer shell by a restricted amount, e.g., approximately ±1 mm in any direction normal to its axis of rotation, play 8 being left between these parts. An upper race of the thrust bearing 6 is free to slide radially on a hardened flanged ring 9. The rotatable member 7 can also, when constrained to do so, tilt slightly in either direction about its unrestrained axis of rotation compressing ring washer 9a as it does. Its actual position within the outer shell 5 is thus, within certain limits, not restricted by the position of the outer shell in relation to an indexing member. However the whole of a collet, including its outer shell, could float in its carrier.

Each collet has means for receiving and engaging with a locating member. In the present embodiment this means is a conical walled recess 11 with its cone axis precisely coaxial with the center axis of the collet workholding engagement 4 and the indexing member 13 is a piston rod of a cylinder and piston arrangement 14, which rod has a conically shaped end 12 to mate with the walls of the recess 11.

The conical end piece 12 has a considerable axial length and high angle of conicity, giving good area of driving contact and a good centering and locating effect.

The piston and cylinder arrangement is of a type in which the piston rod may be driven in rotation independent of its axial position and this is done by a coupling 15 connected to an externally driven shaft direct (or through a suitable gear box) from a motor, e.g., a one-third h.p. electric synchronous motor, for each tool or locating member. An alternative arrangement could be had by employing linear-combined-rotary electrical actuators which would have the dual function of bringing the locating member 13 and its conical end piece 12 forward into contact with the conical recess 11 under linear motion and then to impart its rotational motion to the rotatable member of the collet assembly, thus ensuring simultaneous alignment of and rotation of the workpiece held by the collet. However, a flexible drive to a motor mounted on the main frame of the machine is preferred, since the weight of the motor does not then have to be moved with the tool or locating member, or be supported by a supporting bracket of that tool or member.

The main purpose of the invention is to provide a precise alignment of collets at their respective indexing stations and to be able to rotate these as and when it should be required by bringing the locating members into contact with suitable engagement and mating means provided at one end of the rotatable member of the collet assembly. Thus the indexing action of the turntable or other carrier need not be exact.

While the present embodiment has conical mating recesses and locating members it can be advantageous to employ locating members having a parallel-sided end portion for insertion into a parallel-sided recess in the collet, and being fitted with means for driving or holding the rotatable member of the collet assembly.

At the side of the turntable 1 to which the workpieces are offered, tools such as a drill 17 and a rotary saw 18 are held in respective driving units 19, 20, and are able to be driven axially towards the chuck by fluid actuated cylinder and piston arrangements 21. These preferably are identical with arrangements 14, to maximize the number of interchangeable parts in the machine. Rotary drive of the tools is derived, preferably through flexible drives, from suitable motors, preferably the same type of motor as that which drives the locating members 13 in rotation, these motors not being shown. In a four-collet machine there may be two or three tools leaving one loading and unloading station for the collets, and the turntable is driven in indexing motions by an indexing mechanism having a drive shaft 22, a pinion (not shown) engaging with a ring gear 23 fast with a sleeve 24 which drives the turntable 1. Since the tools, e.g., drill 17 and locating member 13 do not rotate around the main axis they may be precisely aligned in assembly of the machine or fitting of the tool.

A locating member as described is provided at each of the stations which the collets adopt on indexing movement of the turntable and at which a tool will operate on a workpiece in the collet. The members may be driven in rotation or may be stationary. When they are driven in rotation, the motor which drives them through a coupling such as 15 is permanently or intermittently actuated so as to drive the whole of the collet assembly in rotation about its own axis at any speed, usually in contra-rotation against a rotary drill such as 17. The rotation of the collet may be the sole source of rotation of the workpiece against a stationary tool, e.g., a polisher, cutter, or drill.

However, when operations such as saw cutting are carried out by saws such as 18, it may be desired to hold the collet against rotation. In this case an locating member such as 12' which has the same locating action as member 12 when urged into the collet is provided at its lower end with mechanism (not shown) for holding it against rotation and optionally for setting it to a predetermined angular setting. To guide the collet into a predetermined position, a guide sleeve 25 can be associated with the locating member. This has a surface generally in the shape of a mitre which is offered to the collet. Downwardly inclined parts of this surface 26 terminate in reception slots 27. Abutment of the surfaces 26 and ears 10 on the rotatable member 7 during movement of the member 12' towards the collet, drives the collet into an angular setting determined by the angular position of slots 27, which engage the ears 10 when the locating motion of the member 12' is complete. A successive non-rotating locating member could be set to cause the collet to adopt a different rotational relationship with the turntable at a next work station.

The use of magnetically operated collet jaws allows for easy opening for rejection of a faulty workpiece at any stage; and for automatic opening and rejection if a feeler gauge, for example, establishes electrical contact with a workpiece as a result of oversize or distortion in that workpiece.

The forward and return strokes of the tools and locating member are hydraulically powered from a single source of hydraulic power, and are cycled for automatic operations.

Two or more or all of the locating members may be mounted on a common platform which is driven to cause collet-engaging or disengagement movements of those locating members in common. This arrangement is more applicable to large-size machines.

Although the above description has been based on the use of a rotary turntable carrying a number of collet assemblies at equal angular distances apart it is equally applicable to employ the principle of constrained alignment and rotation to machines where the collet assemblies are transported in a linear path or any other path most suitable for performing complex machining operations. The collet housings could for example be linked together on the conveyor belt principle and the rotatable members of the collet housings could be aligned and rotated using the means described.

I claim:

1. In an indexing machine having a plurality of collets borne on a common carrier, each collet including means for holding a workpiece, the carrier being movable as a whole to index the collets respectively to successive work stations, the collets being rotatable about respective axes of rotation and mounted in the carrier with limited play in a plane perpendicular to its axis of rotation to thereby float in the carrier, and there being locating members for engaging and locating the collets at the work stations respectively, said locating members movable towards and away from the collets along the respective axes of rotatability of the collets while the collet carrier is stationary, to engage with and disengage from the collets respectively.

2. An indexing machine having a collet carrier turntable, the collet carrier being rotatable about a central axis, a plurality of collets on the turntable, a plurality of tools positioned to be in operative relation with the collets, means for indexing the turntable in rotation so that a given collet is indexed successively to positions where it is operable on successively by the tools, one tool in each position, the collets mounted in the turntable for limited play movements in a plane normal to the central axis of the turntable to thereby float in the carrier, said collets being restrained against other movements relative to the turntable, a plurality of locating members registering respectively with the tools, each locating member being movable towards the tool, each collet having means for receiving a locating member moving on a line precisely positioned axially relative to a said tool towards the collet while the turntable is stationary and said locating member engaging the collet to position the collet precisely relative to the tool.

3. An indexing machine according to claim 2 wherein at least one locating member is provided with means for driving it in rotation to communicate that drive to the collet when so engaged.

4. An indexing machine according to claim 2 wherein at least one locating member is restrained against rotation.

5. An indexing machine according to claim 4 wherein the said at least one locating member has fast with it a member for guiding the collet to a predetermined rotational attitude relative to the turntable.

6. An indexing machine according to claim 2 wherein the locating member is a plunger with a conical-walled end to mate with a correspondingly shaped recess in the collet.

7. An indexing machine according to claim 2 wherein the tools are movable towards and away from a workpiece held in a said collet by a piston and cylinder arrangement, and the locating members are moved from the collets by a piston and cylinder arrangement, the piston and cylinder arrangements being interchangeable.

8. A multi-station machine tool having:
i. a plurality of work stations,
ii. a plurality of tools, one at each workstation,
iii. a plurality of rotatable workholders,
iv. a common carrier for the workholders, the workholders mounted in the carrier for rotation about their axes and with limited play in a direction perpendicular to its axis of rotation, thus floating relative to the common carrier,
v. means for driving the common carrier in indexing motion to bring each workholder to the work stations in succession,
vi. locating means at each workstation in register precisely with a tool for engaging a workholder at that work station,
vii. means for driving the locating means into engagement with the said workholder by moving it towards the workholder, the workholder and the locating means being such as to bring the workholder into the said precise register with the tool and to couple the locating means rotationally with the workholder upon engagement of the locating means and workholder, and for retracting the locating means from the workholder, and
viii. means for driving each tool towards work held in each said workholder when said workholder is engaged and precisely registered by the locating means, and for retracting the tool from that work.

9. A multi-station machine tool according to claim 8 wherein the machine tool has additionally means for retaining said locating means in a predetermined rotational attitude, and means for bringing the workholder into a predetermined rotational relationship with the said locating means upon engagement of the locating means and workholder.

10. A multi-station machine tool according to claim 8 wherein the machine tool has additionally means for rotating the said locating means whereby to drive the workholders in rotation when the latter are respectively coupled rotationally with the said locating means.

* * * * *